US012283734B2

(12) United States Patent
Wu et al.

(10) Patent No.: US 12,283,734 B2
(45) Date of Patent: Apr. 22, 2025

(54) DIELECTRIC FILTER

(71) Applicant: JIAXING GLEAD ELECTRONICS CO., LTD., Zhejiang (CN)

(72) Inventors: Feijia Wu, Zhejiang (CN); Yuanyuan Zhang, Zhejiang (CN); Guoyun Shao, Zhejiang (CN); Qin Jiang, Zhejiang (CN); Tengjie Wu, Zhejiang (CN); Shao-Chin Lo, Zhejiang (CN); Kuan-Yu Lu, Zhejiang (CN); Kai-Nan Hsieh, Zhejiang (CN)

(73) Assignee: JIAXING GLEAD ELECTRONICS CO., LTD., Zhejiang (CN)

( * ) Notice: Subject to any disclaimer, the term of this patent is extended or adjusted under 35 U.S.C. 154(b) by 0 days.

(21) Appl. No.: 18/273,985

(22) PCT Filed: Mar. 22, 2021

(86) PCT No.: PCT/CN2021/081986
§ 371 (c)(1),
(2) Date: Jul. 25, 2023

(87) PCT Pub. No.: WO2022/160432
PCT Pub. Date: Aug. 4, 2022

(65) Prior Publication Data

US 2024/0413513 A1 Dec. 12, 2024

(30) Foreign Application Priority Data

Jan. 26, 2021 (CN) ......................... 202110109585.0

(51) Int. Cl.
*H01P 1/202* (2006.01)
*H01P 1/20* (2006.01)
(Continued)

(52) U.S. Cl.
CPC ............ *H01P 1/2002* (2013.01); *H01P 1/202* (2013.01); *H01P 1/2056* (2013.01); *H01P 3/16* (2013.01)

(58) Field of Classification Search
CPC ...... H01P 1/2056; H01P 1/2002; H01P 1/202; H01P 1/201; H01P 1/2053; H01P 1/20
See application file for complete search history.

(56) References Cited

U.S. PATENT DOCUMENTS 5,218,329 A * 6/1993 Vangala ................ H01P 1/2056 333/206
5,844,454 A 12/1998 Ono et al.
(Continued)

FOREIGN PATENT DOCUMENTS

CN 1241044 1/2000
CN 1551405 12/2004
(Continued)

OTHER PUBLICATIONS

"First Office Action of China Related Application No. 202110235226.X", issued on Aug. 30, 2021, pp. 1-10.
(Continued)

*Primary Examiner* — Stephen E. Jones
(74) *Attorney, Agent, or Firm* — Bayramoglu Law Offices LLC

(57) ABSTRACT

The present invention provides a novel dielectric filter, which comprises a dielectric body, N+4 through holes, and an end surface metal layer, wherein the end surface metal layer comprises a first metal block, a second metal block, N middle metal blocks, a penultimate metal block, a last metal block, a first metal sideline, a second metal line segment, a third metal line segment, a fourth metal line segment, and a fifth metal line segment; the first metal block, the second metal block, the N middle metal blocks, the penultimate metal block and the last metal block are respectively formed
(Continued)

on peripheral sides of a first resonance hole, a second resonance hole, N middle resonance holes, a penultimate resonance hole and a last resonance hole.

8 Claims, 6 Drawing Sheets

(51) Int. Cl.

| | |
|---|---|
| ***H01P 1/205*** | (2006.01) |
| ***H01P 3/16*** | (2006.01) |

(56) References Cited

U.S. PATENT DOCUMENTS

2006/0267712 A1* 11/2006 Morga .................. H01P 1/2056 333/202
2007/0085628 A1 4/2007 Takubo et al.
2019/0229389 A1 7/2019 Brannon et al.

FOREIGN PATENT DOCUMENTS

| | | |
|---|---|---|
| CN | 206541910 | 10/2017 |
| CN | 107959094 | 4/2018 |
| CN | 208723059 | 4/2019 |
| CN | 208753479 | 4/2019 |
| CN | 110071350 | 7/2019 |
| CN | 209626392 | 11/2019 |
| CN | 111934072 | 11/2020 |
| CN | 113036325 | 6/2021 |
| JP | H1197904 | 4/1999 |
| JP | 5989890 | 9/2016 |

OTHER PUBLICATIONS

"Second Office Action of China Related Application No. 202110235226.X", issued on Mar. 16, 2022, pp. 1-6.

"First Search Report of China Related Application No. 202110235226.X", issued on Aug. 22, 2021, pp. 1-3.

"Second Search Report of China Related Application No. 202110235226.X", issued on Jun. 15, 2022, pp. 1-2.

"International Search Report (Form PCT/ISA/210) of PCT/CN2021/081986," mailed on Jun. 30, 2021, with English translation thereof, pp. 1-4.

"Written Opinion of the International Searching Authority (Form PCT/ISA/237) of PCT/CN2021/081986," mailed on Jul. 1, 2021, pp. 1-3.

* cited by examiner

DIELECTRIC FILTER

CROSS-REFERENCE TO RELATED APPLICATION

This application is a 371 of international application of PCT application serial no. PCT/CN2021/081986 filed on Mar. 22, 2021 which claims the priority benefit of China application no. 202110109585.0 filed on Jan. 26, 2021. The entirety of each of the above mentioned patent applications is hereby incorporated by reference herein and made a part of this specification.

TECHNICAL FIELD

The present invention relates to a novel dielectric filter.

BACKGROUND

In general, a dielectric filter is composed of a dielectric block made of a ceramic material and a plurality of coaxial resonance holes penetrating through the dielectric block. The dielectric filter requires minimum insertion loss inside the passband and minimum attenuation ratio outside the passband to ensure the quality of signal transmission in a communication system. The dielectric filter is provided with an open surface which is coated with metal patterns, and the design of these patterns may be different according to the working frequency spectra required by a communication system; along with the continuous increase in the frequency utilization rate of the communication frequency spectrum, if the design of the patterns on the surface of the filter is unreasonable, when the high rejection index at the near end of the filter is met, the requirement of rejection on the secondary far end cannot be considered, and thus the quality of communication signals is influenced.

SUMMARY

Technical Problem

If the design of the patterns on the surface of the filter is unreasonable, when the high rejection index at the near end of the filter is met, the requirement of rejection on the secondary far end cannot be considered, and thus the quality of communication signals is influenced.

Solution for Solving the Problem

Technical Solution

The present invention provides a novel dielectric filter, which comprises:

a dielectric body, provided with an open surface, a short-circuit surface, a top surface, a bottom surface and two side surfaces, wherein an end surface pattern consisting of a hollowed-out area A and an end surface metal layer is formed on the open surface, hollowed-out areas B are respectively arranged on left and right sides of the bottom surface, and the two hollowed-out areas B respectively extend to the open surface;

N+4 through holes, wherein N is a natural number not less than 1, the N+4 through holes penetrate through the dielectric body at intervals from left to right, one ends of the through holes are located on the open surface, the other ends of the through holes are located on the short-circuit surface, inner walls of the N+4 through holes are provided with metal layers to form N+4 resonance holes, and the N+4 resonance holes comprise a first resonance hole, a second resonance hole, N middle resonance holes, a penultimate resonance hole and a last resonance hole which are sequentially formed from left to right;

wherein the hollowed-out area A comprises a first sub-frame area surrounding the first resonance hole, a second sub-frame area surrounding the second resonance hole, a penultimate sub-frame area surrounding the penultimate resonance hole, a last sub-frame area surrounding the last resonance hole, and N middle sub-frame areas respectively surrounding the N middle resonance holes;

the end surface metal layer comprises a first metal block, a second metal block, N middle metal blocks, a penultimate metal block, a last metal block, a first metal sideline, a second metal line segment, a third metal line segment, a fourth metal line segment, and a fifth metal line segment; the first metal block, the second metal block, the N middle metal blocks, the penultimate metal block and the last metal block are respectively formed on peripheral sides of the first resonance hole, the second resonance hole, the N middle resonance holes, the penultimate resonance hole and the last resonance hole, and the first sub-frame area, the second sub-frame area, the N middle sub-frame areas, the penultimate sub-frame area and the last sub-frame area are respectively formed on peripheral sides of the first metal block, the second metal block, the N middle metal blocks, the penultimate metal block and the last metal block;

the first metal sideline is arranged at a joint of the open surface, the adjacent two side surfaces, the top surface and the bottom surface and is respectively connected to the left side surface, the right side surface, the bottom surface and the top surface; the second metal line segment is arranged on a lower side of the open surface corresponding to the first sub-frame area and the second sub-frame area, the third metal line segment is arranged on a lower side of the open surface corresponding to the N middle sub-frame areas, the fourth metal line segment extends to a lower side of an (N+2)th sub-frame area from a lower side of the second sub-frame area, and the fourth metal line segment is arranged above the third metal line segment in parallel and forms a gap with the third metal line segment; the fifth metal line segment is arranged on a lower side of the open surface corresponding to the penultimate sub-frame area and the last sub-frame area;

a grounded metal layer, arranged on an area outside the top surface, the bottom surface, the two side surfaces and the hollowed-out areas B of the short-circuit surface, wherein the grounded metal layer arranged on the short-circuit surface is electrically connected with the metal layers on the inner walls of the N+4 resonance holes to form a short-circuit end, and the N+4 resonance holes are respectively electrically connected with the first metal block, the second metal block, the N middle metal blocks, the penultimate metal block and the last metal block on the open surface to form an open end;

wherein one of the hollowed-out areas B extends to the open surface, and both ends of the one of the hollowed-out area B are respectively connected to the first sub-frame area and the second sub-frame area on the open surface, the other one of the hollowed-out areas B extends to the open surface, and both ends of the other one of the hollowed-out area B are respectively connected to the penultimate sub-frame area and the last sub-frame area on the open surface;

an input electrode, one end thereof being arranged at one of the hollowed-out areas B, and the other end thereof extending to the open surface to be L-shaped and being connected to the second metal line segment on the open surface, so as to enable the input electrode to connect a signal to the second resonance hole and meanwhile form an external zero point with the first resonance hole; and an output electrode, one end thereof being arranged at one of the hollowed-out areas B, and the other end thereof extending to the open surface to be L-shaped and being connected to the fifth metal line segment on the open surface, so as to enable the input electrode to connect a signal to the penultimate resonance hole and form an external zero point with the last resonance hole.

In some implementations, wherein a number of the N+4 resonance holes is seven, and the N+4 resonance holes include a first resonance hole, a second resonance hole, a third resonance hole, a fourth resonance hole, a fifth resonance hole, a sixth resonance hole, and a seventh resonance hole.

In some implementations, wherein a first longitudinal metal straight line segment is formed between the first sub-frame area and the second sub-frame area, a first hollowed-out space segment is formed between the second sub-frame area and a third sub-frame area, a second longitudinal metal straight line segment is formed between the third sub-frame area and a fourth sub-frame area, a second hollowed-out space segment is formed between the fourth sub-frame area and a fifth sub-frame area, and a third longitudinal metal straight line segment is formed between the fifth sub-frame area and the penultimate sub-frame area; a fourth longitudinal metal straight line segment is formed between the penultimate sub-frame area and the last sub-frame area;

one end of the first longitudinal metal straight line segment is located at the first sub-frame area and the second sub-frame area of the hollowed-out area A, and the other end of the first longitudinal metal straight line segment is connected to the second metal line segment;

one end of the second longitudinal metal straight line segment is connected to the first metal sideline, and the other end of the second longitudinal metal straight line segment is located at the third sub-frame area and the fourth sub-frame area;

one end of the third longitudinal metal straight line segment is connected to the first metal sideline, and the other end of the third longitudinal metal straight line segment is connected to the third metal line segment;

one end of the fourth longitudinal metal straight line segment is connected to the first metal sideline, and the other end of the fourth longitudinal metal straight line segment is located at the penultimate sub-frame area and the last sub-frame area.

In some implementations, wherein the short-circuit surface is further provided with a longitudinally-extending hollowed-out straight line segment.

In some implementations, wherein a first attenuation pole is formed between the second metal line segment, the first longitudinal metal straight line segment and the first metal block; a second attenuation pole is formed outside a high-frequency sideband between the fifth metal line segment and the last metal block.

In some implementations, wherein the N+4 resonance holes are disposed in parallel at equal heights on the dielectric body.

In some implementations, wherein one of the hollowed-out areas B is U-shaped, and both sides of the one of the hollowed-out areas B respectively extend to the open surface and both ends of the one of the hollowed-out areas B are respectively connected to the first sub-frame area and the second sub-frame area on the open surface; the other one of the hollowed-out areas B is U-shaped, and both sides of the other one of the hollowed-out areas B respectively extend to the open surface and both ends of the other one of the hollowed-out areas B are respectively connected to the last sub-frame area and the penultimate sub-frame area on the open surface.

In some implementations, the novel dielectric filter further comprises a metal shield cover.

According to the present invention, in an aspect, the attenuation ratio at the near end outside the passband is increased, and in another aspect, the influence of far-end harmonic waves is delayed by increasing inductive coupling while considering the attenuation zero point.

DETAILED DESCRIPTION OF THE EMBODIMENTS

Figure 1:
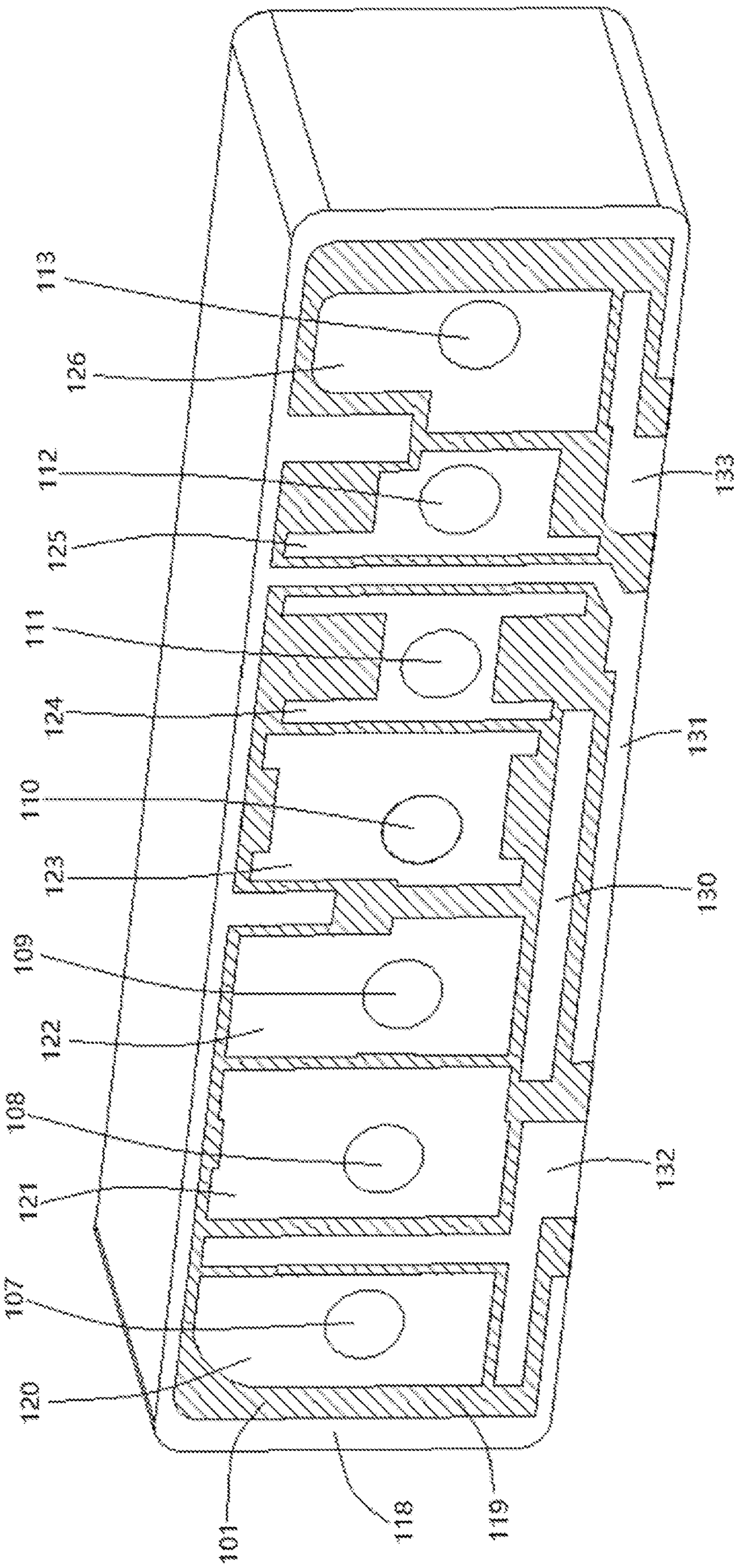
FIGS. 1-4 are schematic structural diagrams of the dielectric filter according to the present invention.

Embodiments of the present invention are described in detail below, and examples of the embodiments are shown in the drawings, where the same or similar reference numbers throughout the article indicate the same or similar elements or elements with same or similar functions. The embodiments described below with reference to the drawings are examples and are intended to explain the present invention and should not be construed as limitations on the present invention.

In the description of the present invention, it should be understood that the terms “upper”, “lower”, “front”, “rear”, “left”, “right”, “longitudinal”, “lateral”, “top”, “bottom”, “inside”, and the like indicate orientations or location relationships based on those shown in the drawings, which are merely for the convenience of describing the present invention and simplifying the description, rather than indicating or implying that the apparatus or element referred to must have a specific orientation, be constructed and operated in the specific orientation, so it cannot be understood as a limitation to the present invention.

Figure 2:
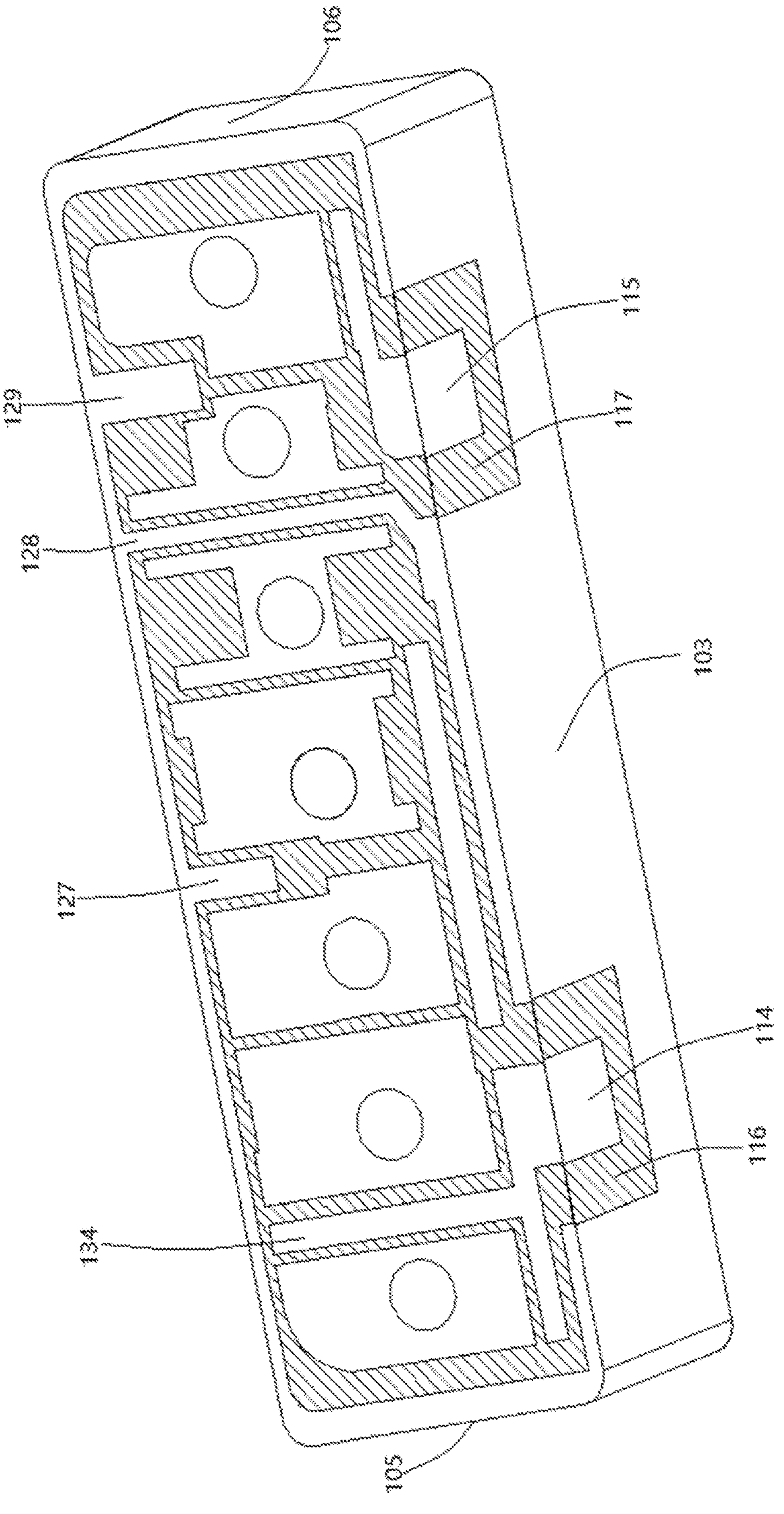
Figure 3:
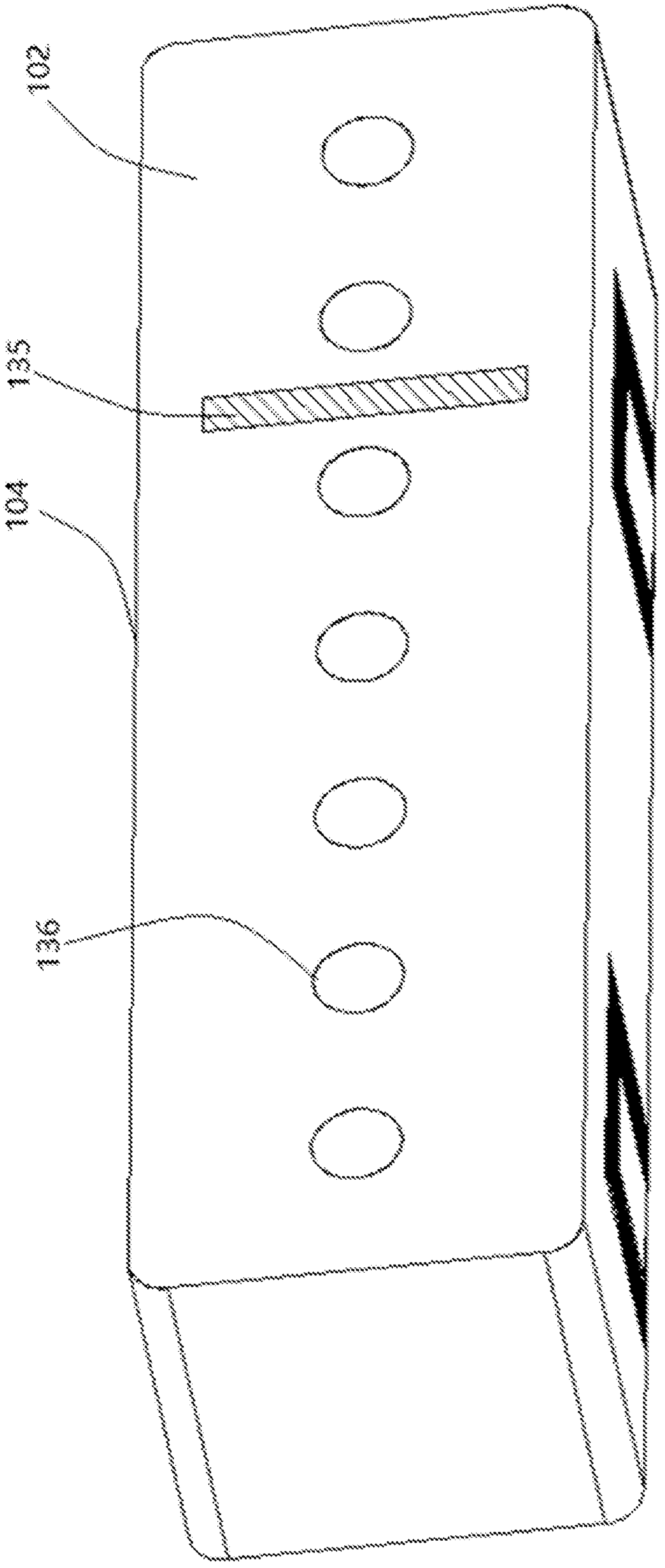
Figure 4:
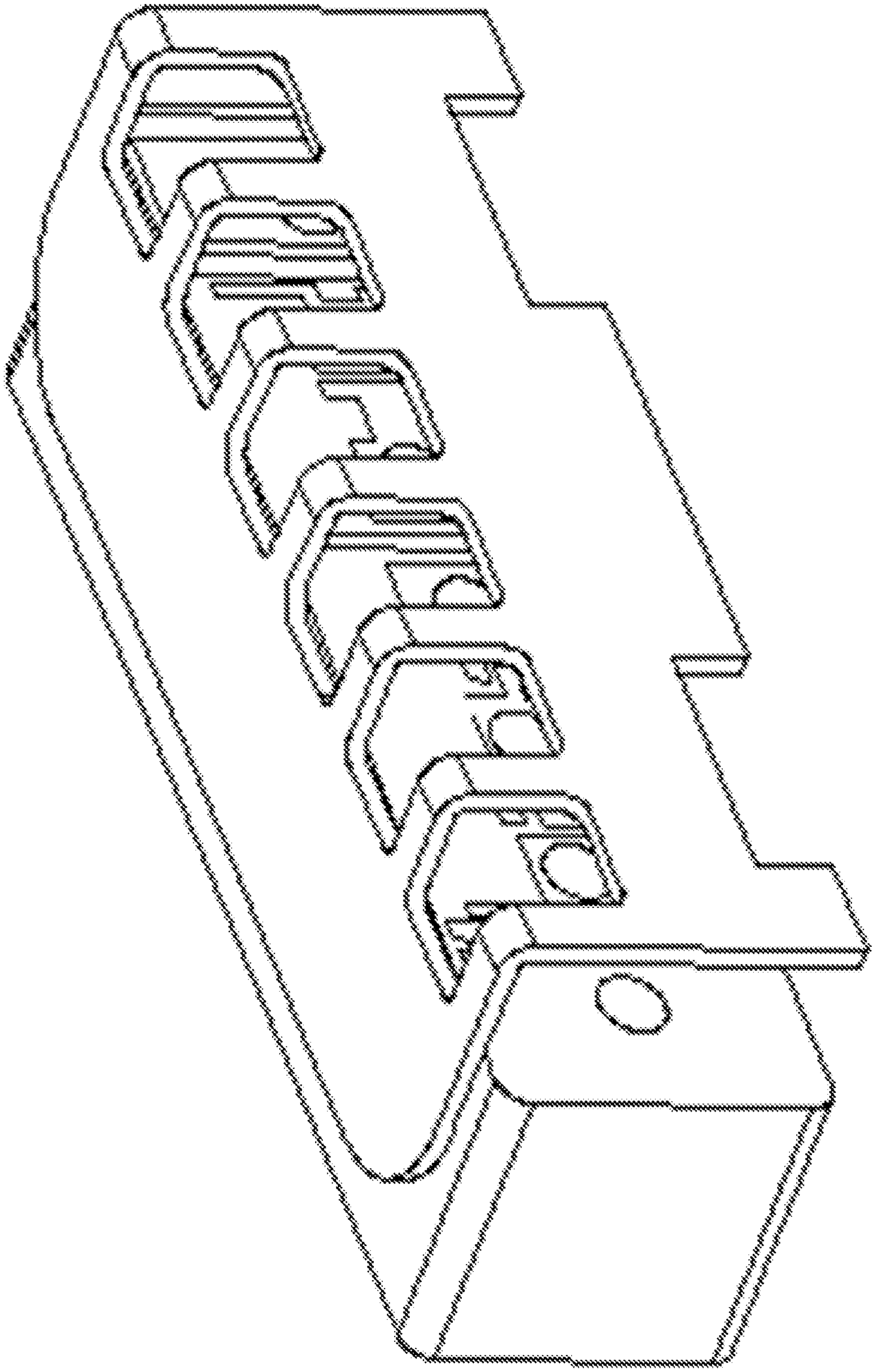

Referring to FIGS. 1-3, an embodiment of the present invention provides a novel dielectric filter, which comprises a dielectric body 100, N+4 through holes (where N is a natural number not less than 1), a grounded metal layer, an input electrode 114, and an output electrode 115.

The dielectric body 100 is an integral dielectric block made of a ceramic material and is provided with an open surface 101, a short-circuit surface 102, a top surface 104, a bottom surface 103, and two side surfaces 105, 106, wherein an end surface pattern consisting of a hollowed-out area A 119 and an end surface metal layer is formed on the open surface, hollowed-out areas B 116, 117 are respectively arranged on left and right sides of the bottom surface 103, and the two hollowed-out areas B 116, 117 respectively extend to the open surface 101.

N+4 through holes penetrate through the dielectric body 100 at intervals from left to right, one ends of the through holes are located on the open surface 101, the other ends of the through holes are located on the short-circuit surface 102, inner walls of the N+4 through holes are provided with metal layers to form N+4 resonance holes, and the N+4 resonance holes comprise a first resonance hole 107, a second resonance hole 108, N middle resonance holes 109, 110 and 111, a penultimate resonance hole 112 and a last resonance hole 113 which are sequentially formed from left to right; illustratively, referring to FIG. 1, the number of the resonance holes in this embodiment is seven, and the resonance holes include a first resonance hole 107, a second resonance hole 108, a third resonance hole 109, a fourth resonance hole 110, a fifth resonance hole 111, a sixth resonance hole 112, and a seventh resonance hole 113.

The hollowed-out area A 119 comprises a first sub-frame area surrounding the first resonance hole 107, a second sub-frame area surrounding the second resonance hole 108, a penultimate sub-frame area surrounding the penultimate resonance hole 112, a last sub-frame area surrounding the last resonance hole 113, and N middle sub-frame areas respectively surrounding the N middle resonance holes 109, 110 and 111.

The end surface metal layer comprises a first metal block 120, a second metal block 121, N middle metal blocks 122, 123 and 124, a penultimate metal block 125, a last metal block 126, a first metal sideline 118, a second metal line segment 132, a third metal line segment 131, a fourth metal line segment 130, and a fifth metal line segment 133; the first metal block 120, the second metal block 121, the N middle metal blocks 122, 123 and 124, the penultimate metal block 125 and the last metal block 126 are respectively formed on peripheral sides of the first resonance hole 107, the second resonance hole 108, the N middle resonance holes 109, 110 and 111, the penultimate resonance hole 112 and the last resonance hole 113, so as to enable the resonance holes and the open surface 101 to be electrically connected to form an open end, and the first sub-frame area, the second sub-frame area, the N middle sub-frame areas, the penultimate sub-frame area and the last sub-frame area are respectively formed on peripheral sides of the first metal block 120, the second metal block 121, the N middle metal blocks 122, 123 and 124, the penultimate metal block 125 and the last metal block 126 so as to provide conditions for coupling.

It should be noted that the "metal block" may be in any shape, such as a rectangle, and other arbitrary shapes; the "sidelines" include, but are not limited to, straight lines, broken lines or arc lines; the "line segments" include, but are not limited to, straight line segments, broken line segments, or arc line segments.

The first metal sideline 118 is arranged at a joint of the open surface 101, the adjacent two side surfaces 105, 106, the top surface 104 and the bottom surface 103, so as to enable the open surface 101 to be respectively connected to the left side surface 105, the right side surface 106, the bottom surface 103 and the top surface 104; the second metal line segment 132 is arranged on a lower side of the open surface 101 corresponding to the first sub-frame area and the second sub-frame area, the third metal line segment 131 is arranged on a lower side of the open surface corresponding to the N middle sub-frame areas, the fourth metal line segment 130 extends to a lower side of an (N+2)th sub-frame area from a lower side of the second sub-frame area, and the fourth metal line segment 130 is arranged above the third metal line segment 131 in parallel and forms a gap with the third metal line segment 131; the fifth metal line segment 133 is arranged on a lower side of the open surface 101 corresponding to the penultimate sub-frame area and the last sub-frame area.

The grounded metal layer is arranged on an area outside the top surface 104, the bottom surface 103, the two side surfaces 105, 106 and the hollowed-out areas B 116, 117 of the short-circuit surface, wherein the grounded metal layer arranged on the short-circuit surface 102 is electrically connected with the metal layers on the inner walls of the N+4 resonance holes to form a short-circuit end, and the N+4 resonance holes are respectively electrically connected with the first metal block 120, the second metal block 121, the N middle metal blocks 122, 123 and 124, the penultimate metal block 125 and the last metal block 126 on the open surface to form an open end.

Where one of the hollowed-out areas B 116 extends to the open surface 101, and both ends of the hollowed-out area B are respectively connected to the first sub-frame area and the second sub-frame area on the open surface, the other one of the hollowed-out areas B 117 extends to the open surface 101, and both ends of the hollowed-out area B are respectively connected to the penultimate sub-frame area and the last sub-frame area on the open surface 101.

One end of the input electrode 114 is arranged at one of the hollowed-out areas B 116, and the other end thereof extends to the open surface 101 to be L-shaped and is connected to the second metal line segment 132 on the open surface 101, so as to enable the input electrode 114 to connect a signal to the second resonance hole 108 and meanwhile form an external zero point with the first resonance hole 107.

One end of the output electrode 115 is arranged at one of the hollowed-out areas B 117, and the other end thereof extends to the open surface 101 to be L-shaped and is connected to the fifth metal line segment 133 on the open surface 101, so as to enable the input electrode to connect a signal to the penultimate resonance hole 112 and form an external zero point with the last resonance hole 113.

The first sub-frame area, the second sub-frame area, the third sub-frame area, the fourth sub-frame area, the penultimate sub-frame area and the last sub-frame area are formed around the first resonance hole 107, the second resonance hole 108, the third resonance hole 109, the fourth resonance hole 110, the fifth resonance hole 111, the sixth resonance hole 112 and the seventh resonance hole 113, respectively.

In this embodiment, a first longitudinal metal straight line segment 134 is formed between the first sub-frame area and the second sub-frame area, a first hollowed-out space segment is formed between the second sub-frame area and the third sub-frame area, a second longitudinal metal straight line segment 127 is formed between the third sub-frame area and the fourth sub-frame area, a second hollowed-out space segment is formed between the fourth sub-frame area and the fifth sub-frame area, and a third longitudinal metal straight line segment 128 is formed between the fifth sub-frame area and the penultimate sub-frame area; a fourth longitudinal metal straight line segment 129 is formed between the penultimate sub-frame area and the last sub-frame area; one end of the first longitudinal metal straight line segment 134 is located at the first sub-frame area and the second sub-frame area of the hollowed-out area A 119, and the other end of the first longitudinal metal straight line segment is connected to the second metal line segment 132; one end of the second longitudinal metal straight line segment 127 is connected to the first metal sideline 118, and the other end of the second longitudinal metal straight line segment is located at the third sub-frame area and the fourth sub-frame area; one end of the third longitudinal metal straight line segment 128 is connected to the first metal sideline 118, and the other end of the third longitudinal metal straight line segment is connected to the third metal line segment 131; one end of the fourth longitudinal metal straight line segment 129 is connected to the first metal sideline 118, and the other end of the fourth longitudinal metal straight line segment is located at the penultimate sub-frame area and the last sub-frame area.

Figure 5:
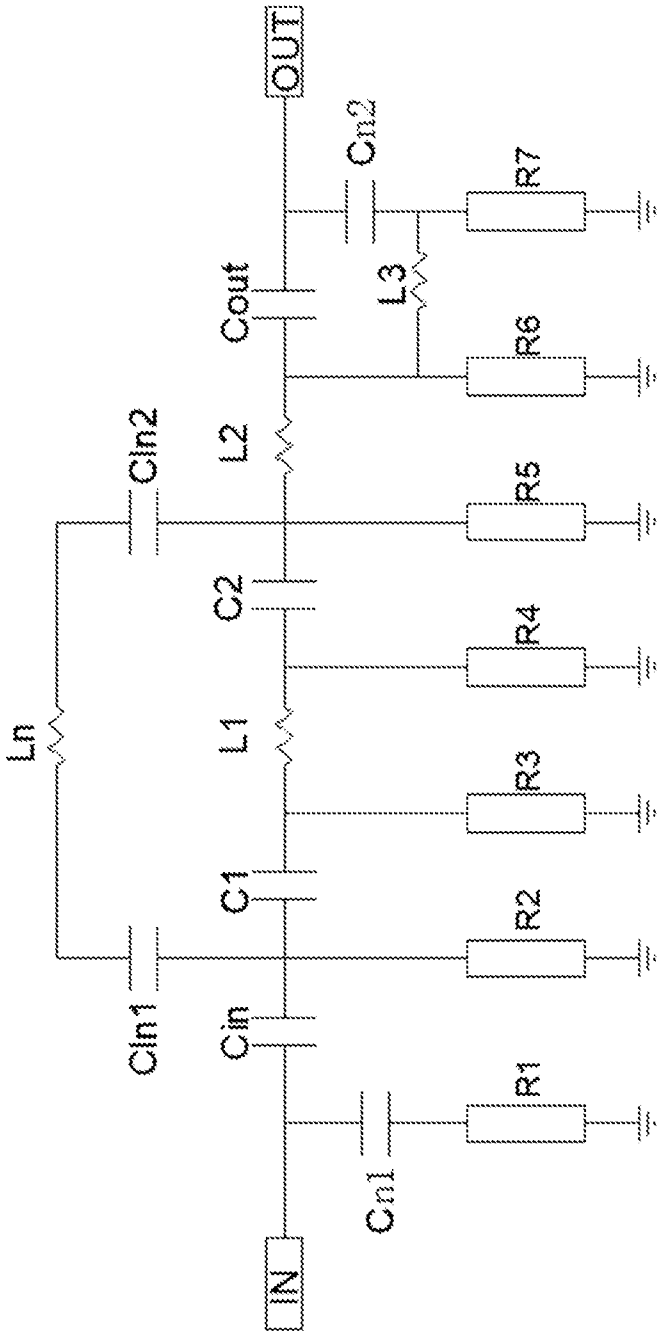
FIG. 5 is an equivalent circuit diagram of the dielectric filter according to the present invention.

FIG. 5 shows an equivalent circuit diagram of the dielectric filter, where the input end IN represents the signal input electrode 114, the output end OUT represents the signal output electrode 115, and the distance between the second metal line segment 132, the first longitudinal metal straight line segment 134 and the second metal block 121 of the second resonance hole 108 is equivalent to a capacitance Cin; the distance between the fifth metal line segment 133 and the sixth metal block 125 of the sixth resonance hole 112 is equivalent to a capacitance Cout; the resonance holes 107, 108, 109, 110, 111, 112 and 113 and the metal blocks surrounding the surfaces of the resonance holes are equivalent to resonators R1, R2, R3, R4, R5, R6 and R7 which are compatible in both capacitance and inductance.

The distance between the second metal block 121 and the third metal block 122 is equivalent to a capacitance C1, the electric field formed by the hollowed-out area between the third metal block 122 and the fourth metal block 123 and the second longitudinal metal straight line segment 127 is equivalent to an inductance L1, the distance between the fourth metal block 123 and the fifth metal block 124 is equivalent to a capacitance C2, the electric field formed by the hollowed-out area between the fifth metal block 124 and the sixth metal block 125 and the third longitudinal metal straight line segment 128 is equivalent to L2, and the electric field formed by the hollowed-out area between the sixth metal block 125 and the seventh metal block 126 and the fourth longitudinal metal straight line segment 129 is equivalent to L3.

The equivalent inductance of the fourth metal line segment 130 is Ln, and the distances between the fourth metal line segment and the second metal block 121 and between the fourth metal line segment and the fifth metal block 124 are equivalent to capacitances Cln1 and Cln2, which form attenuation poles at the low-frequency sideband and the high-frequency sideband, respectively.

Figure 6:
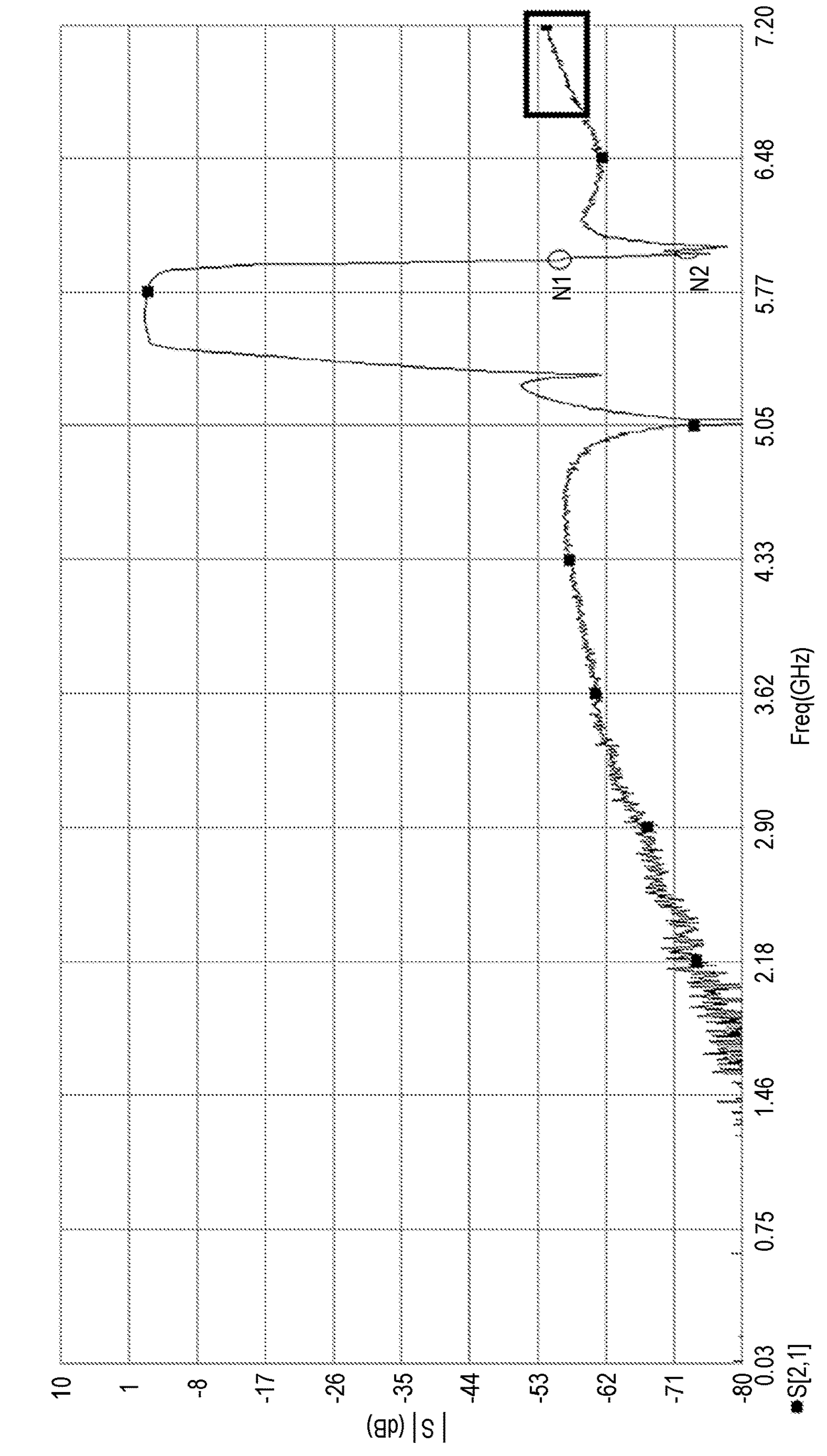
FIG. 6 is a measurement curve diagram of the dielectric filter according to the present invention.

As shown in FIG. 6, the distances between the second metal line segment 132, the first longitudinal metal straight line segment 134 and the first metal block 120 form a first attenuation pole N1 outside the high-frequency sideband; the distance between the fifth metal line segment 133 and the seventh metal block 126 forms a second attenuation pole N2 outside the high-frequency sideband.

Referring to FIG. 3, the short-circuit surface 102 is further provided with a longitudinally-extending hollowed-out straight line segment 135, which weakens the inductive coupling amount, and functions in the integrity of the inductive grounding and delays the influence of harmonic waves on out-of-band rejection.

The N+4 resonance holes have the same diameter and are disposed in parallel at equal heights on the dielectric body 100.

Specifically, one of the hollowed-out areas B 116, 117 is U-shaped, and both sides of the one of the hollowed-out areas B respectively extend to the open surface 101 and both ends of the one of the hollowed-out areas B are respectively connected to the first sub-frame area and the second sub-frame area on the open surface 101; the other one of the hollowed-out areas B 116, 117 is U-shaped, and both sides of the other one of the hollowed-out areas B respectively extend to the open surface 101 and both ends of the other one of the hollowed-out areas B are respectively connected to the last sub-frame area and the penultimate sub-frame area on the open surface 101.

The dielectric filter further comprises a metal shield cover.

FIG. 6 is a measurement curve schematic diagram showing a forward transmission coefficient S21 of a filter structure, and as shown in the figure, on the basis of different metal patterns of the filter structure, the locations of attenuation poles of the filter structure are different according to out-of-band rejection points, in addition to meeting the frequency band selected by the design. In the figure, N1 is the attenuation pole formed by the capacitive coupling between the second metal line segment 132, the first longitudinal metal straight line segment 134 and the first metal block 120, and N2 is the attenuation pole formed by the capacitive coupling between the fifth metal line segment 133 and the seventh metal block 126; inductive coupling is added between the penultimate metal block 125 on the open surface of the sixth resonance hole 112 and the last metal block 126 on the open surface of the last resonance hole 113, so as to improve the influence of far-end harmonic waves.

The present invention optimizes the structural characteristics of the filter, and the metal patterns are externally formed on the open surface of the filter; the port coupling is changed to be made on one side opposite to two resonators, and meanwhile, the inductive coupling is added between the metal layers of the two resonance holes on the open surface, so that the far-end rejection of the filter can be improved, and the increase in the volume and the cavity number of the dielectric blocks can be overcome.

In the description of the present specification, reference to the description of "one embodiment", "some embodiments", "a specific embodiment", "an alternative embodiment", "an example", or "some examples" and the like means that a particular feature, structure, material, or characteristic described in connection with the embodiments or examples is included in at least one embodiment or example of the present invention. In this specification, the schematic representations of the terms used above do not necessarily refer to the same embodiment or example. Moreover, particular features, structures, materials, or characteristics described may be combined in any suitable manner in any one or more embodiments or examples.

Although the embodiments of the present invention have been shown and described, it can be understood by those of ordinary skill in the art that various changes, modifications, substitutions and alterations may be made to these embodiments without departing from the principle and spirit of the present invention, and the scope of the present invention is defined in the appended claims and equivalents thereof.

What is claimed is:

1. A novel dielectric filter, comprising:

a dielectric body, provided with an open surface, a short-circuit surface, a top surface, a bottom surface and two side surfaces, wherein an end surface pattern consisting of a hollowed-out area A and an end surface metal layer is formed on the open surface, hollowed-out areas B are respectively arranged on a left side and a right sides of the bottom surface, and the hollowed-out areas B respectively extend to the open surface;

N+4 through holes, wherein N is a natural number not less than 1, the N+4 through holes penetrate through the dielectric body at intervals from left to right, one ends of the through holes are located on the open surface, the other ends of the through holes are located on the short-circuit surface, inner walls of the N+4 through holes are provided with metal layers to form N+4 resonance holes, and the N+4 resonance holes comprise a first resonance hole, a second resonance hole, N middle resonance holes, a penultimate resonance hole and a last resonance hole which are sequentially formed from left to right;

wherein the hollowed-out area A comprises a first sub-frame area surrounding the first resonance hole, a second sub-frame area surrounding the second resonance hole, a penultimate sub-frame area surrounding the penultimate resonance hole, a last sub-frame area surrounding the last resonance hole, and N middle sub-frame areas respectively surrounding the N middle resonance holes;

the end surface metal layer comprises a first metal block, a second metal block, N middle metal blocks, a penultimate metal block, a last metal block, a first metal sideline, a second metal line segment, a third metal line segment, a fourth metal line segment, and a fifth metal line segment; the first metal block, the second metal block, the N middle metal blocks, the penultimate metal block and the last metal block are respectively formed on peripheral sides of the first resonance hole, the second resonance hole, the N middle resonance holes, the penultimate resonance hole and the last resonance hole, and the first sub-frame area, the second sub-frame area, the N middle sub-frame areas, the penultimate sub-frame area and the last sub-frame area are respectively formed on peripheral sides of the first metal block, the second metal block, the N middle metal blocks, the penultimate metal block and the last metal block;

the first metal sideline is arranged at a joint of the open surface, the two side surfaces, the top surface and the bottom surface and is respectively connected to the two side surfaces, the bottom surface and the top surface; the second metal line segment is arranged on a lower side of the open surface corresponding to the first sub-frame area and the second sub-frame area, the third metal line segment is arranged on a lower side of the open surface corresponding to the N middle sub-frame areas, the fourth metal line segment extends to a lower side of an (N+2)th sub-frame area from a lower side of the second sub-frame area, and the fourth metal line segment is arranged above the third metal line segment in parallel and forms a gap with the third metal line segment; the fifth metal line segment is arranged on a lower side of the open surface corresponding to the penultimate sub-frame area and the last sub-frame area;

a grounded metal layer, arranged on an area outside the top surface, the bottom surface, the two side surfaces and the hollowed-out areas B of the short-circuit surface, wherein the grounded metal layer arranged on the short-circuit surface is electrically connected with the metal layers on the inner walls of the N+4 resonance holes to form a short-circuit end, and the N+4 resonance holes are respectively electrically connected with the first metal block, the second metal block, the N middle metal blocks, the penultimate metal block and the last metal block on the open surface to form an open end;

wherein one of the hollowed-out areas B extends to the open surface, and both ends of the one of the hollowed-out area B are respectively connected to the first sub-frame area and the second sub-frame area on the open surface, an other one of the hollowed-out areas B extends to the open surface, and both ends of the other one of the hollowed-out area B are respectively connected to the penultimate sub-frame area and the last sub-frame area on the open surface;

an input electrode, one end thereof being arranged at the one of the hollowed-out areas B, and an other end thereof extending to the open surface to be L-shaped and being connected to the second metal line segment on the open surface, so as to enable the input electrode to connect a signal to the second resonance hole and meanwhile form an external zero point with the first resonance hole; and an output electrode, one end thereof being arranged at one of the hollowed-out areas B, and the other end thereof extending to the open surface to be L-shaped and being connected to the fifth metal line segment on the open surface, so as to enable the input electrode to connect a signal to the penultimate resonance hole and form an external zero point with the last resonance hole.

2. The dielectric filter according to claim 1, wherein a number of the N+4 resonance holes is seven, and the N+4 resonance holes include a first resonance hole, a second resonance hole, a third resonance hole, a fourth resonance hole, a fifth resonance hole, a sixth resonance hole, and a seventh resonance hole.

3. The dielectric filter according to claim 2, wherein a first longitudinal metal straight line segment is formed between the first sub-frame area and the second sub-frame area, a first hollowed-out space segment is formed between the second sub-frame area and a third sub-frame area, a second longitudinal metal straight line segment is formed between the third sub-frame area and a fourth sub-frame area, a second hollowed-out space segment is formed between the fourth sub-frame area and a fifth sub-frame area, and a third longitudinal metal straight line segment is formed between the fifth sub-frame area and the penultimate sub-frame area; a fourth longitudinal metal straight line segment is formed between the penultimate sub-frame area and the last sub-frame area;

one end of the first longitudinal metal straight line segment is located at the first sub-frame area and the second sub-frame area of the hollowed-out area A, and an other end of the first longitudinal metal straight line segment is connected to the second metal line segment;

one end of the second longitudinal metal straight line segment is connected to the first metal sideline, and an other end of the second longitudinal metal straight line segment is located at the third sub-frame area and the fourth sub-frame area;

one end of the third longitudinal metal straight line segment is connected to the first metal sideline, and an other end of the third longitudinal metal straight line segment is connected to the third metal line segment;

one end of the fourth longitudinal metal straight line segment is connected to the first metal sideline, and an other end of the fourth longitudinal metal straight line segment is located at the penultimate sub-frame area and the last sub-frame area.

4. The dielectric filter according to claim 1, wherein the short-circuit surface is further provided with a longitudinally-extending hollowed-out straight line segment.

5. The dielectric filter according to claim 3, wherein a first attenuation pole is formed between the second metal line segment, the first longitudinal metal straight line segment and the first metal block; a second attenuation pole is formed outside a high-frequency sideband between the fifth metal line segment and the last metal block.

6. The dielectric filter according to claim 1, wherein the N+4 resonance holes are disposed in parallel at equal heights on the dielectric body.

7. The dielectric filter according to claim 1, wherein one of the hollowed-out areas B is U-shaped, and both sides of the one of the hollowed-out areas B respectively extend to the open surface and both ends of the one of the hollowed-out areas B are respectively connected to the first sub-frame area and the second sub-frame area on the open surface; another one of the hollowed-out areas B is U-shaped, and both sides of the other one of the hollowed-out areas B respectively extend to the open surface and both ends of the other one of the hollowed-out areas B are respectively connected to the last sub-frame area and the penultimate sub-frame area on the open surface.

8. The dielectric filter according to claim 1, further comprising a metal shield cover.

* * * * *